United States Patent [19]

Talwar et al.

[11] Patent Number: 5,729,829
[45] Date of Patent: Mar. 17, 1998

[54] INTERFERENCE MITIGATION METHOD AND APPARATUS FOR MULTIPLE COLLOCATED TRANSCEIVERS

[75] Inventors: Ashok Kumar Talwar, Westlake Village; Barry Francis Fitzgerald, Agoura Hills, both of Calif.

[73] Assignee: American Nucleonics Corporation, Westlake Village, Calif.

[21] Appl. No.: 609,042

[22] Filed: Feb. 29, 1996

[51] Int. Cl.⁶ .................................................. H04B 15/02
[52] U.S. Cl. .......................... 455/63; 455/296; 455/303; 455/307
[58] Field of Search .................... 455/63, 67.1, 67.3, 455/73, 82, 83, 103, 132–135, 295–296, 303, 306, 307; 333/101, 126, 129, 132

[56] References Cited

U.S. PATENT DOCUMENTS

| | | |
|---|---|---|
| 4,952,193 | 8/1990 | Talwar. |
| 4,970,479 | 11/1990 | Landt et al. ............... 330/101 |
| 5,033,108 | 7/1991 | Lockwood ................ 455/103 |
| 5,117,505 | 5/1992 | Talwar. |
| 5,125,108 | 6/1992 | Talwar. |
| 5,140,699 | 8/1992 | Kozak. |
| 5,148,117 | 9/1992 | Talwar. |
| 5,152,010 | 9/1992 | Talwar. |
| 5,355,103 | 10/1994 | Kozak. |
| 5,392,009 | 2/1995 | Talwar. |
| 5,428,831 | 6/1995 | Monzello et al.. |
| 5,446,424 | 8/1995 | Pierro. |
| 5,548,838 | 8/1996 | Talwar et al.. |
| 5,574,978 | 11/1996 | Talwar et al. ............... 455/303 |
| 5,630,223 | 5/1997 | Bahu et al. ................. 455/296 |

OTHER PUBLICATIONS

Ghose, Rabindra N., "Collocation of Receivers and High-Power Broadcast Transmitters," *IEEE Transactions on Broadcasting* v. 34 n. 2 (Jun. 1988).

Tsui, James B., *Microwave Receivers and Related Components* (Peninsula Publishing, 1985) pp. 296–297.

*Primary Examiner*—Nguyen Vo
*Attorney, Agent, or Firm*—Hoffmann & Baron, LLP

[57] ABSTRACT

An apparatus and method for mitigating interference between multiple collocated radio transceivers operating through a common antenna. In a preferred form, the apparatus includes a filter bank containing bandpass filters corresponding to a number of desired operating frequency bands. Each transceiver can be selectively electrically interconnected with the common antenna through an appropriate filter. The filters attenuate out-of-band interference. An adaptive cancellation device is also provided to compare samples of the transmitted and received signals and produce an interference cancellation signal that is substantially equal in amplitude and 180° out of phase with the coherent portions of the compared transmitted and received signals.

12 Claims, 5 Drawing Sheets

5,729,829

INTERFERENCE MITIGATION METHOD AND APPARATUS FOR MULTIPLE COLLOCATED TRANSCEIVERS

BACKGROUND OF THE INVENTION

1. Field of the Invention

The present invention relates to radio communications, and more particularly relates to mitigation of interference between collocated radio transceivers.

2. Description of the Prior Art

In order to minimize the overall size of communications systems employing multiple radio transceivers, it is desirable to collocate the transceivers on a common platform. However, this can lead to the problem of cosite interference, that is, interference caused by radiative and conductive interactions of the collocated transceivers.

Interfering signals, which can hamper reception of in-bound communications by transceivers operating in receive mode, may result from a number of causes. These may include the carrier waves or wideband noise generated by collocated transceivers operating in transmit mode; co-channel operation in frequency-hopping systems; and antenna pattern distortion (in multiple antenna systems). Collocated transceivers may also generate spurious interfering signals at odd harmonics of their fundamental frequency as well as pseudo-white-noise over a wide band of frequencies on either side of their operating frequency. Several techniques have been proposed to minimize undesirable interference between collocated transceivers, including agile filtering, agile filtering with multicoupling and interference cancellation. Agile filtering involves coupling a frequency-adjustable filter, typically a bandpass filter, to the input of a transceiver operating in receive mode. While the filter attenuates out-of-band noise, no protection is provided against interfering signals in the filter's passband. Further, agile filtering requires a priority management scheme wherein a priority rank is assigned to each transceiver; if collocated transmitters and receivers are assigned close or identical operating frequencies, the lower-priority one must be shut down until the frequencies are reassigned. This may result in loss of data associated with the transmission or receipt of signals by the subordinate transceiver.

In agile filtering with multicoupling, similar techniques are employed, but a single antenna is used to eliminate antenna pattern distortion. The in-band interference and priority-management problems discussed above are still encountered.

Interference cancellation techniques may involve sampling the output of transmitting transceivers to eliminate, from the desired received signal, any interfering signal with a frequency close to the transmitter carrier frequency. This method is not practical where the interference is strong or where substantial wide band noise is produced by the transmitting transceiver. Alternatively, one can instead implement an interference cancellation scheme which involves cancellation of substantially all interfering signals outside the receiver's operating frequency band. However, this latter technique does not protect against interfering signals with frequencies close to, or the same as, the desired received signal.

A more advanced approach to interference elimination has recently been set forth in co-assigned U.S. patent application Ser. No. 08/351,586; filed Dec. 7, 1994 and entitled "Adaptive Method and Apparatus for Eliminating Interference Between Radio Transceivers"; the disclosure of which is incorporated herein by reference. In the '586 application, a plurality of transceivers are coupled to a common antenna through a power combiner. A filter circuit is provided for each transceiver. The filtered signal from each transmitting transceiver is sampled and compared to the received signal in a plurality of cancelers; the cancelers then produce a plurality of cancellation signals that are combined and injected into the received signal. The cancellation signals consist of the coherent portions of the transmitted and received signals, shifted 180°. The combined cancellation signals are injected into the received signal before it is sampled, thereby providing adaptive interference elimination.

The technology of the '586 application, although an improvement over the prior art, still has several disadvantages. The use of a power combiner to couple the transceivers to a common antenna entails power loss. Further, the filter circuits require bulky, expensive dual hopping filters.

In view of the disadvantages of the prior art, there is a need for an interference mitigation method and apparatus for multiple collocated transceivers which provides protection against both in-band and out-of-band interference, even where the interference is strong; which minimizes power loss; which eliminates data loss; and which can be easily implemented at relatively low cost with available, compact hardware.

OBJECTS AND SUMMARY OF THE INVENTION

It is an object of the present invention to provide an interference mitigation method and apparatus for multiple collocated transceivers which permit operation through a common antenna while minimizing power loss.

It is another object of the present invention to provide an interference mitigation method and apparatus for multiple collocated transceivers which afford protection against both in-band and out-of-band interference.

It is yet another object of the present invention to provide an interference mitigation method and apparatus for multiple collocated transceivers which prevent the loss of critical data.

It is a further object of the present invention to provide an interference mitigation method and apparatus for multiple collocated transceivers which afford protection even against strong interference.

It is still a further object of the present invention to provide an interference mitigation apparatus for multiple collocated transceivers which combines the use of bandpass filters with interference cancellation techniques using relatively compact and inexpensive hardware, and to also provide an interference mitigation method using such an apparatus.

In accordance with one form of the present invention, an interference mitigation apparatus for multiple collocated transceivers includes a filter bank having a filter for each of a plurality of desired operating frequency bands. The filter bank is electrically coupled to a common antenna. A switch matrix has a series of first ports which are electrically interconnected with the filter bank (one first port for each filter). The switch matrix also has a series of second ports (one for each transceiver), each of which can be selectively electrically interconnected with any of the first ports. Each transceiver may in turn be selectively electrically interconnected to the corresponding switch matrix second port through either of a pair of transmission paths, including a transmitted signal transmission line and a received signal path. A cancellation device is electrically interconnected with the transmission lines to obtain a sample of each transmitted signal, and is also electrically interconnected with the received signal paths for sampling of received signals and injection of an interference cancellation signal.

The filter bank may be subdivided into odd and even filter banks. The odd and even filter banks may then be electrically interconnected to the antenna through a circulator or a two way power splitter.

In accordance with another form of the present invention, the switch matrix may be dispensed with and each transceiver may be coupled to the common antenna through its own individual tunable bandpass filter. The tunable bandpass filters are each individually tuned to the operating frequency of their transceiver.

In a method according to the present invention, a main output signal of each transmitting transceiver is sampled to provide sampled output signals; each of the main output signals is then filtered through a bandpass filter (part of a filter bank) corresponding to the given transceiver's assigned frequency band; and the filtered main output signals are transmitted. A main received signal is passed through the filter bank, which has a filter set to receive in each frequency band corresponding to a receiving transceiver, resulting in filtering of substantially all out-of-band interference. The main received signal is sampled to provide a sampled received signal, which is compared to the sampled output signals and used to generate an interference cancellation signal. The interference cancellation signal is combined with the main received signal and divided for distribution to the receiving transceivers.

These and other objects, features and advantages of the present invention will become apparent from the following detailed description of illustrative embodiments thereof, which is to be read in connection with the accompanying drawings.

DETAILED DESCRIPTION OF THE PREFERRED EMBODIMENTS

Figure 1:
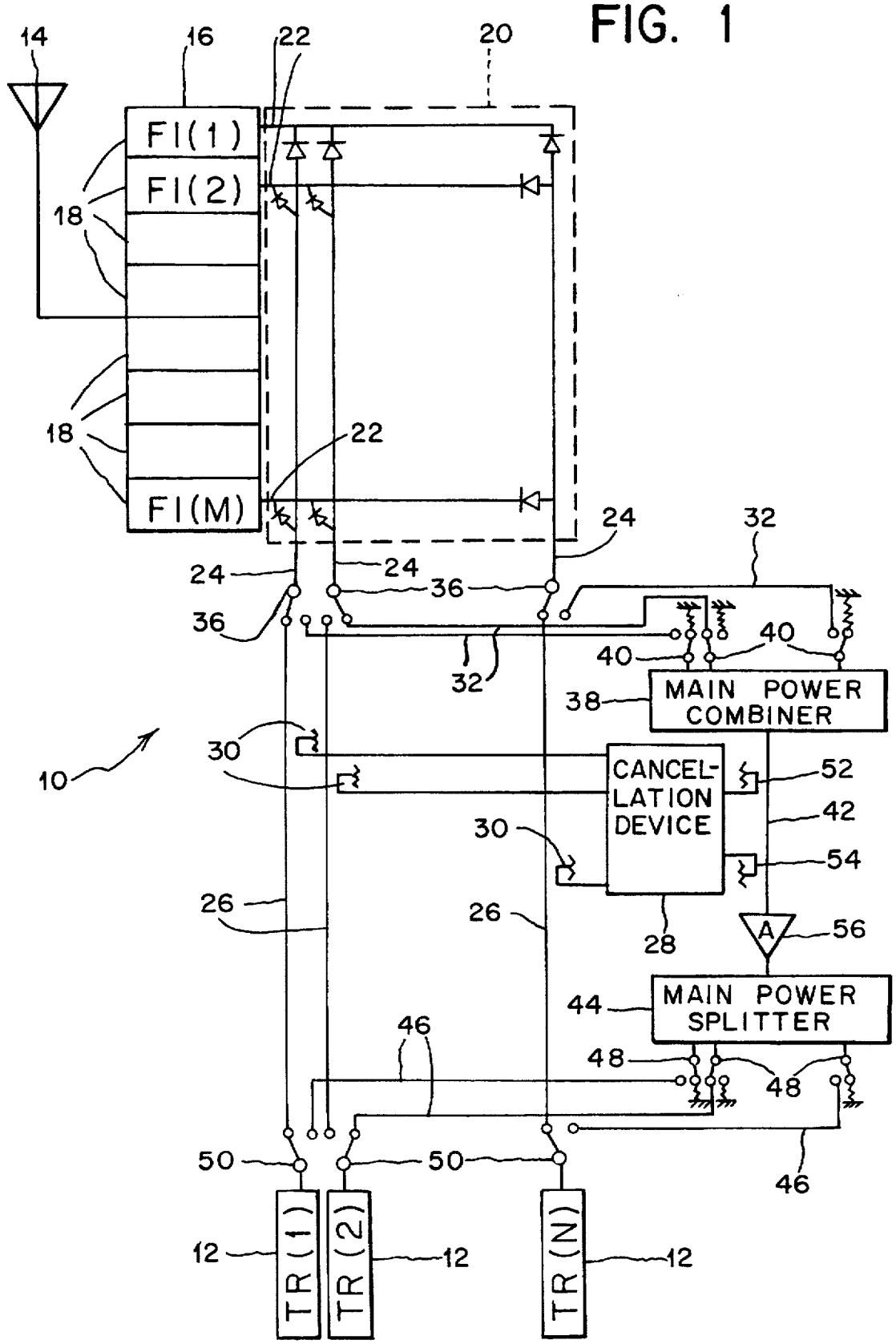
FIG. 1 is a schematic of an interference mitigation apparatus in accordance with the present invention.

Referring to FIG. 1, an interference mitigation apparatus, designated generally as 10, connects a plurality of frequency-agile radio transceivers 12 with a common antenna 14. In general, the number of transceivers is designated as N and the individual transceivers are labeled as TR(1) through TR(N). At least some, and preferably each of the transceivers may operate in either transmit or receive mode. Those of the N transceivers operating in transmit mode are referred to interchangeably as transmitters or transmitting transceivers, while those of the N transceivers operating in receive mode are referred to interchangeably as receivers or receiving transceivers. At any given time, a transceiver may be transmitting, receiving, or open-circuited.

Apparatus 10 includes a filter bank 16 with a plurality of filters 18 electrically interconnected with common antenna 14. In general, the number of filters is designated as M and the individual filters are labeled as FI(1) through FI(M). Preferably, the filters are bandpass filters with contiguous passbands, each filter's passband corresponding to one of M desired operating frequency bands for the N collocated transceivers. The number of filters M should be greater than or equal to the number of transceivers N so that each of the M desired operating frequency bands will only be used by one transceiver at a time.

The band pass filters ideally present, within their passband, an impedance substantially the same as the characteristic impedance of the transmission medium (e.g., 50 ohms for a coaxial line). Outside the passband, the impedance is very high, effectively an open circuit. Accordingly, when a plurality of contiguous bandpass filters are connected to a common antenna, as in the present invention, only one of the filters presents the characteristic impedance at any given frequency. The remainder of the filters ideally present an open circuit and draw no power from the antenna. Accordingly, the present invention permits interconnection of a plurality of filters to the common antenna, effectively in parallel with one another, without the necessity for a power combiner with its concomitant combiner power loss. It is to be understood that the lowest frequency filter may be a low pass filter instead of a bandpass filter, if signals or interference below the lowest desired frequency band are not anticipated, while still obtaining the foregoing benefits. Similarly, if signals or interference above the highest desired frequency band are not anticipated, the highest frequency filter may be a high pass filter.

Still referring to FIG. 1, the apparatus 10 also includes a switch matrix 20, which has M first ports 22 which are electrically interconnected with the M filters of the filter matrix, and N second ports 24. Preferably, the filters are connected in a stacked (i.e., electrically parallel) arrangement between the common antenna 14 and the M first ports 22 of switch matrix 20. Switch matrix 20 provides selective electrical interconnection between any of the M first ports and N second ports, through any of a number of techniques well-known in the art. Accordingly, at least one, and preferably each of, the N second ports 24 which correspond to the N transceivers 12, may be selectively electrically interconnected with the common antenna through at least one, and preferably any desired one, of the M filters of the filter bank for transmission or reception in the desired frequency band to which the filter corresponds. Out-of-band signals are thus attenuated. It will be appreciated that switch matrix 20 can have any suitable construction. Typically, a plurality of diodes are provided for interconnection purposes. They can be individually biased on or off by control signals, thereby presenting a short or open circuit and effecting a selected interconnection between any one of the M first ports and any one of the N second ports. A suitable switch matrix which may be used is described in U.S. Pat. No. 5,446,424, entitled "Microwave Crosspoint Blocking Switch Matrix and Assembly Employing Multilayer Stripline and Pin Diode Switching Elements", the disclosure of which is incorporated herein by reference.

The N second ports 24 of switch matrix 20 may in turn be selectively electrically interconnected with the N transceivers 12 through N transmission path pairs. At least one of, and preferably each, transmission path pair includes a transmitted signal transmission line 26 and a received signal transmission path (a preferred configuration of which will be described in greater detail below). When a given transceiver 12 is in transmit mode, it is connected to its corresponding switch matrix second port through the associated transmitted signal transmission line 26. When in receive mode, a transceiver 12 is connected to its corresponding switch matrix second port through the associated received signal transmission path.

Apparatus 10 also preferably includes cancellation device 28. The cancellation device is electrically coupled to each of the transmitted signal transmission lines 26, preferably with directional couplers 30, in order to receive a sample of the transmitted signal from each of the N transceivers that is operating in transmit mode. The cancellation device 28 is also electrically interconnected with each of the received signal transmission paths of the N transmission path pairs for both receipt of a received signal sample and injection of an interference cancellation signal. A preferred method of interconnection of cancellation device 28 with the received signal transmission paths will be discussed below.

The received signal sample includes both an interference portion and a non-interference portion. The cancellation device 28 is electrically configured to compare the transmitted signal samples with the received signal sample and to produce an interference cancellation signal that has substantially the same frequency and amplitude characteristics as the interference portion of the received signal sample but is substantially 180° out of phase with it, so as to result in destructive interference, effectively canceling the interference portion of the received signal.

Still referring to FIG. 1, a preferred form of received signal transmission path includes N first transmission line segments 32 having first and second ends. The first ends are selectively electrically interconnected with the N second ports 24 of switch matrix 20 through switches 36. The second ends are selectively electrically interconnected to a main power combiner 38 having N input ports, through switches 40. Preferably, the input ports of main power combiner 38 can also be connected through switches 40 to impedance-matched terminations, in order to prevent reflections.

Main power combiner 38 combines the received signals from all operating frequency bands. An error correction transmission line 42 is coupled to the output of combiner 38 to carry the combined signals. The preferred form of received signal transmission path also includes main power splitter 44 having N output ports and an input port. The combined signals enter the input port of splitter 44. N second transmission line segments 46 have first ends which are selectively electrically interconnected with the N output ports of splitter 44 via switches 48, and also have second ends which are selectively electrically interconnected with transceivers 12 via switches 50. Preferably, the output ports of splitter 44 can also be connected to impedance-matched terminations through switches 48 to prevent reflections. Switches 50 are electrically configured to permit selective electrical interconnection of transceivers 12 with either transmission lines 26 or the received signal transmission paths just described, i.e., the first and second transmission line segments 32 and 46, error correction transmission line 42, main power combiner 38, and main power splitter 44.

Continuing to refer to FIG. 1, the preferred interconnection between interference cancellation device 28 and the received signal transmission paths includes error correction signal injection directional coupler 52 coupled to error correction transmission line 42 for injection of the interference cancellation signal, and also includes error sampling directional coupler 54, also coupled to error correction transmission line 42. Preferably, error sampling directional coupler 54 is interconnected with error correction transmission line 42 at a point where it samples the received signals after the error correction signal injection directional coupler 52 has injected the interference cancellation (error correction) signal. In this way, adaptive interference cancellation is achieved, i.e., the corrected signal is sampled for the portions that are coherent with the transmitted signals. In order to make up for at least a portion of power losses incurred in the received signals between the common antenna 14 and the main power splitter 44, low noise amplifier 56 is preferably provided in error correction transmission line 42, to amplify the corrected received signal.

In operation, the transmitting transceiver(s) (TR(1) and TR(N) in FIG. 1) are electrically interconnected with corresponding second ports 24 of switch matrix 20 through switches 50, transmitted signal transmission lines 26 and switches 36. Second ports 24 are then in turn electrically interconnected with common antenna 14 through switch matrix 20 and appropriate filters 18 of filter bank 16. Each port 24 is connected to antenna 14 through only one filter 18, corresponding to the desired transmitting frequency band of its corresponding transmitting transceiver. Accordingly, each transmitted signal is filtered to attenuate out-of-band noise.

The receiving transceiver(s) (TR(2) in FIG. 1) are electrically interconnected to corresponding second ports 24 of switch matrix 20 through the previously-described received signal transmission path including switches 36, first transmission line segments 32, main power combiner 38, error correction transmission line 42, low noise amplifier 56, main power splitter 44, switches 48, second transmission line segments 46 and switches 50. Second ports 24 of switch matrix 20 are in turn electrically interconnected with common antenna 14 through switch matrix 20 and appropriate filters 18 of filter bank 16. Each port 24 is connected to antenna 14 through only one filter 18, corresponding to the desired receive frequency band of its corresponding receiving transceiver. Accordingly, each receive signal is filtered to attenuate out-of-band noise. The filtering of the transmitted and received signals to eliminate out-of-band noise reduces the power required for the interference cancellation signal.

Cancellation device 28 samples each transmitted signal through directional couplers 30 and compares the transmitted signals to a received signal sample from directional coupler 54. Those portions of the transmitted and received signals that are coherent represent interference. Based on the detection of the coherent signals, the cancellation device 28 effectively modifies a portion of the sampled transmitted signals and generates an error correction signal (also referred to as an interference cancellation signal) which is essentially equal in amplitude and 180° out-of-phase with the interfering signals on the received signal path. This cancellation signal is injected via error correction signal injection directional coupler 52 (also referred to as a summing coupler) into error correction line 42 where it cancels or at least minimizes the interfering signal portion of the received signal to form a corrected signal. Low noise amplifier 56 amplifies the corrected signal to make up for losses. As mentioned above, because both reception and transmission are filtered, the amount of interference to be canceled by cancellation device 28 is reduced, thereby cutting its power requirements. A preferred form of cancellation device 28 will be discussed in greater detail below.

Figure 2:
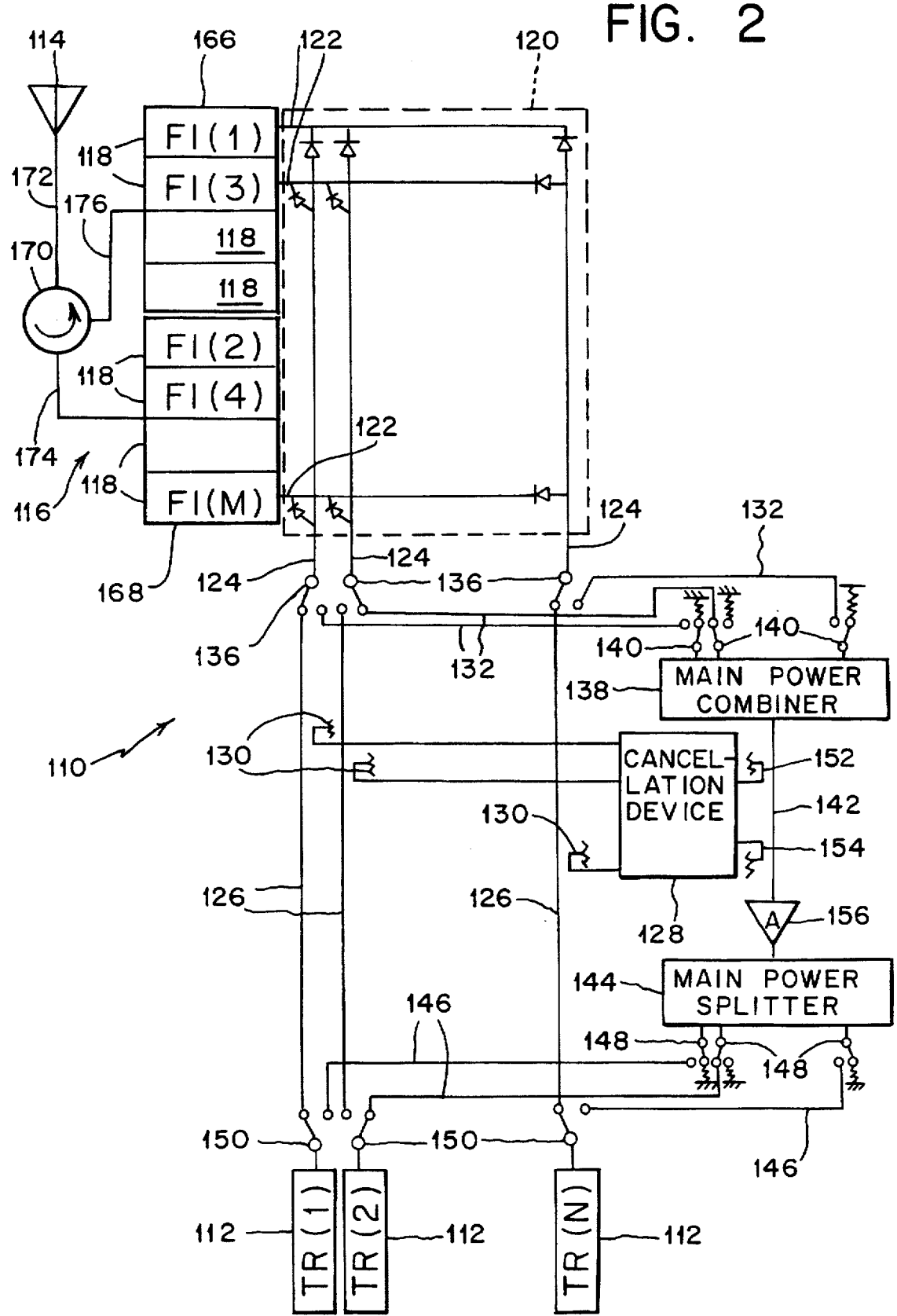
FIG. 2 is a schematic similar to FIG. 1 showing an alternative arrangement of the filter bank.

Referring now to FIG. 2, wherein like elements have been given the same reference numbers as in FIG. 1 incremented by 100, there is shown an embodiment of the invention employing a modified electrical interconnection between the filter bank 116 and common antenna 114. In this embodiment, filter bank 116 is divided into two separate filter banks, odd filter bank 166 and even filter bank 168. The odd filter bank 166 contains those of the M filters that are odd-numbered and the even filter bank contains those of the M filters that are even numbered. The odd and even numbering of the filters 118 refers to the frequency position of the individual filters in the operating band of filter banks 166, 168 in relation to all other filters.

The odd filter bank 166 and even filter bank 168 are electrically interconnected with common antenna 114 via circulator 170. The book *Microwave Receivers and Related Components*, by James B. Tsui, Peninsula Publishing, 1985, describes (at pages 296–97) the interconnection of a circulator with odd and even filter banks, and is incorporated herein by reference. Circulator 170 includes an input port 172 and first and second output ports 174 and 176 respectively. First output port 174 is electrically interconnected with one of the odd and even filter banks, for example, the even filter bank 168 as shown in FIG. 2, while second output port 176 is electrically interconnected with the other of the odd and even filter banks, for example, the odd filter bank 166 as shown in FIG. 2. The input signal from common antenna 114 is fed into input port 172 of circulator 170. It first reaches first output port 174, where it will pass through the even filter bank 168 if it matches any of the characteristic frequencies of the filters 118 in even filter bank 168. If it does not match any of those frequencies, it will reflect and reach second output port 176 where it will pass through an appropriate filter 118 in odd filter bank 166.

The purpose of using circulator 170 with odd and even filter banks 166 and 168 is to achieve a better voltage standing wave ratio (VSWR) than is possible with the configuration shown in FIG. 1. In FIG. 1, there is potential for signals at the edge of a given desired frequency band to be partially passed by an adjacent filter, due to overlap in the passbands of neighboring filters. This is eliminated in the configuration of FIG. 2, wherein the adjacent filters are separated into odd and even banks. It is to be understood that the filters are numbered consecutively (from lowest frequency to highest) in accordance with their desired frequency band. Losses in circulator 170 are generally on the order of 0.2–0.3 dB. The remainder of the apparatus of FIG. 2 is identical to that of FIG. 1.

Figure 3:
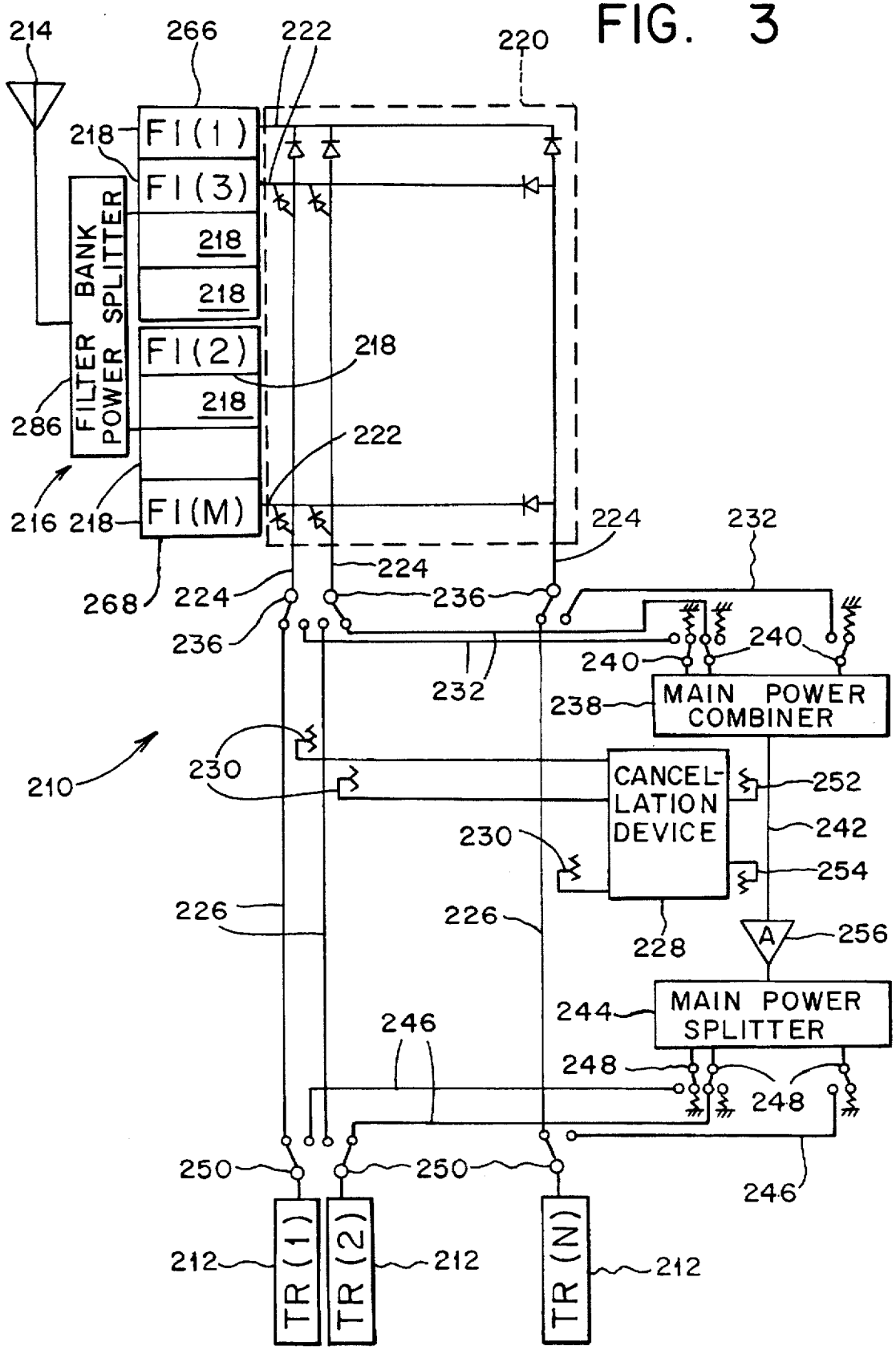
FIG. 3 is a schematic similar to FIGS. 1 and 2 showing yet another alternative arrangement of the filter bank.

At low frequencies, on the order of 50–100 MHz, circulators are either unavailable, or otherwise bulky and expensive. For operation at these frequencies, another alternative configuration, shown in FIG. 3, is possible. In FIG. 3, like elements have received the same numbers as in FIG. 2, incremented by 100. In the configuration shown in FIG. 3, circulator 170 of FIG. 2 is replaced by filter bank power splitter 286. Operation is similar to the configuration of FIG. 2, except that a 3 dB power loss is encountered in the filter bank power splitter 286. Thus, at frequencies where a circulator is available, the configuration of FIG. 2 is preferred.

Figure 5:
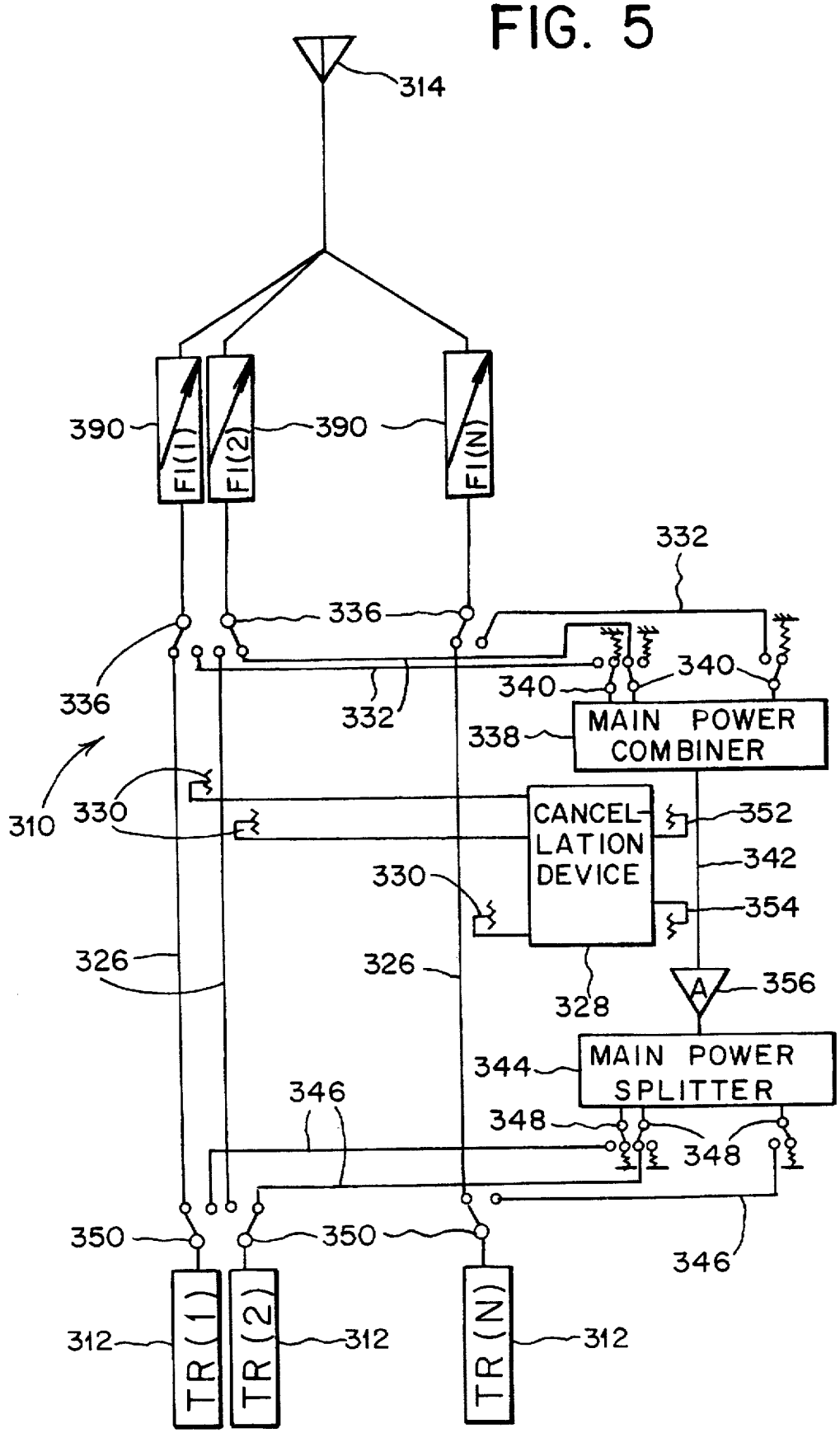
FIG. 5 is a schematic of an interference mitigation apparatus in accordance with an alternative embodiment of the present invention.

FIG. 5 depicts an alternative embodiment of the present invention which does not employ a switch matrix. Like parts have the same reference numbers as in FIG. 1, incremented by 300. Instead of the switch matrix, tunable bandpass filters 390 are interposed between switches 336 and common antenna 314. Rather than connect each transceiver 312 to antenna 314 via a fixed filter corresponding to the transceiver's operating frequency band (by use of a switch matrix), in the embodiment of FIG. 5, each transceiver is provided with its own tunable bandpass filter which is adjusted by control signals to the desired operating frequency of the transceiver. In all other respects, the embodiment of FIG. 5 is similar to that of FIGS. 1–3.

Figure 4:
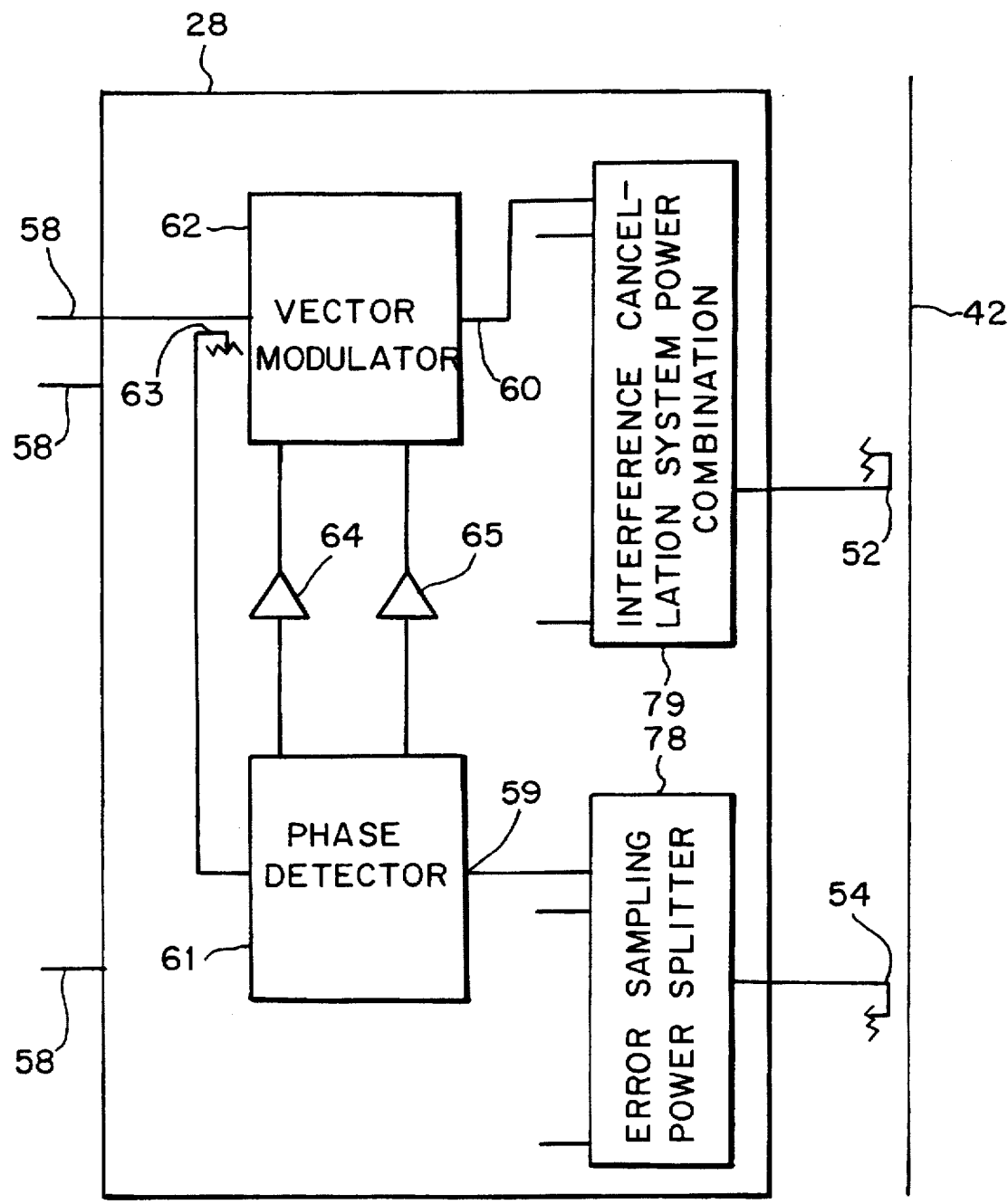
FIG. 4 is a schematic depicting the interconnection of canceler loops with the apparatus of the present invention.

Referring now to FIG. 4, a preferred embodiment of the cancellation device 28 will be described. Preferably, cancellation device 28 includes N cancellation loops corresponding to each of the transmitted signal transmission lines of the N transmission path pairs and the number of transceivers. Each loop includes a transmitted signal sample input port 58 electrically interconnected by one of the directional couplers 30 (shown in FIG. 1) to its corresponding transmitted signal transmission line 26 (shown in FIG. 1). Each loop also includes a received signal sample input port 59 and an interference cancellation signal output port 60.

Each loop also includes a phase detector 61 (also referred to as a synchronous detector) and a vector modulator 62 (also referred to as a signal controller). Phase detector 61 has a first input port electrically interconnected with transmitted signal sample input port 58 via directional coupler 63 for input of a sample of the transmitted signal from the corresponding transmitting transceiver. Phase detector 61 also has a second input port which is the same as received signal sample input port 59. Phase detector 61 also has I and Q output ports respectively connected to the inputs of I and Q loop integrators and/or amplifiers 64 and 65 respectively. Phase detector 61 compares the received and transmitted signal samples in order to detect in-phase (coherent) portions of the received and transmitted signal samples and then supplies I (in-phase) and Q (quadrature phase) DC signals to the I and Q output ports respectively. The I and Q signals are then amplified and/or integrated by components 64 and 65 to create control signals provided to the vector modulator.

Vector modulator 62 has a first input port (which is the same as transmitted signal sample input port 58), and also has I and Q control signal input ports connected to the outputs of I and Q loop integrators/amplifiers 64 and 65 respectively. Vector modulator 62 also has an output port (which is the same as interference cancellation signal output port 60). Based on the I and Q control signals provided to it, vector modulator 62 effectively modifies a portion of the sample signal of the transmitted signal to produce an interference cancellation signal that is essentially equal in amplitude and 180° out of phase with the interfering signal in the received signal path (on transmission line 42).

The operation of the cancellation loop discussed above is described in greater detail in U.S. Pat. No. 5,117,505, entitled "Intereference Cancellation System Having Noise Reduction Features and Method", the disclosure of which is incorporated herein by reference. It is to be understood that, although FIG. 4 shows only a single cancellation loop, one is provided for each of the N transceivers.

Still referring to FIG. 4, cancellation device 28 also includes error sampling power splitter 78 having an input port electrically interconnected with error sampling directional coupler 54, and having N output ports, each electrically interconnected with the received signal sample input port 59 of one of the N cancellation loops. Cancellation device 28 also includes an interference cancellation signal power combiner 79 having N input ports each electrically interconnected with the interference cancellation system output port 60 of one of the N canceler loops. Interference cancellation system power combiner 79 combines the interference cancellation signals from all the loops to produce a combined interference cancellation signal at its output port, which is electrically interconnected with the error correction signal injection directional coupler 52 for injection of the combined interference cancellation signal into error correction transmission line 42.

It is to be understood that the embodiments of the invention shown in FIGS. 1, 2, 3 and 5 may be provided with control circuits (not shown) for adjusting the operating frequency bands of the transceivers; controlling the various switches and switch matrices to connect the transceivers to corresponding filters (FIGS. 1, 2 and 3) or tuning the associated tunable filter (FIG. 5); and changing the transmission path between antenna and transceiver depending on whether the transceiver is operating in the transmitting or receiving mode. Suitable control signals for the control circuits can be generated by a control computer or microprocessor such as described in U.S. Pat. No. 5,140,699, the disclosure of which is incorporated herein by reference.

The present invention provides a method for mitigating interference between N collocated radio transceivers operating through a common antenna, where each transceiver has a transmit and a receive mode and an associated frequency band. In this method, a main output signal of each of the N transceivers operating in transmit mode is sampled to provide a sampled transmitted output signal. Each of the main output signals is filtered through a filter corresponding to the associated frequency band of the transceiver that has produced the signal in order to substantially prevent subsequent transmission of out-of-band interference. Subsequent to the sampling step, after the signals have been filtered, they are transmitted through the common antenna. The number of the N transceivers operating in receive mode can be designated as X. A main received signal is filtered through a filter bank having a filter set to receive in each of the associated frequency bands of the X receiving transceivers. The main received signal will have an interference component (caused by the transmitting transceivers and any other interference) and a non-interference component (i.e., the desired signal received by the antenna). The filtering step removes substantially all out-of-band interference from the main received signal. The method further includes sampling the main received signal to provide a sampled received signal and comparing the sampled transmitted output signals and the sampled receive signals in a cancellation device. The cancellation device generates an error correction signal which is substantially identical to but is 180° out of phase with the interference component of the main received signal remaining in the received signal path. The final steps include combining the main received signal (in the received signal path) and the error correction signal to produce an error-corrected received signal that is substantially free of interference, and dividing the received signal X-ways for distribution to the X transceivers operating in receive mode.

As a result of the present invention, it is possible to provide an interference mitigation method and apparatus for multiple collocated transceivers which permit operation through a common antenna while minimizing power loss. The present invention provides protection against both in-band and out-of-band intereference. The elimination of potential priority conflicts on a given band prevents the loss of critical data. The use of filters in conjunction with a cancellation device results in an interference mitigation method and apparatus which afford protection even against strong interference. The combination of interference cancellation with band pass filters is achieved, in the present invention, using relatively compact and inexpensive hardware.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. Apparatus for mitigating interference between a plurality of collocated radio transceivers operating through a common antenna, at least some of said transceivers having both a transmit mode and a receive mode, said apparatus comprising:

(a) a filter bank having a plurality of filters, said filter bank being electrically coupled to said common antenna, each of said plurality of filters corresponding to one of a plurality of desired operating frequency bands;

(b) a switch matrix having a plurality of first ports electrically connected to said plurality of filters and a plurality of second ports corresponding to said plurality of transceivers, each of said plurality of second ports being capable of selective electrical interconnection with each of said plurality of first ports, whereby at least one of said plurality of second ports may be electrically interconnected with said common antenna through at least one of said plurality of filters of said filter bank, for at least one of transmission and reception in the desired frequency band to which said filter corresponds;

(c) a plurality of transmission path pairs for selective electrical interconnection of said plurality of transceivers and said plurality of corresponding second ports, at least one of said plurality of transmission path pairs including a transmitted signal transmission line and a received signal transmission path, each of said transceivers being connected to its corresponding switch matrix second port through said transmitted signal transmission line when in transmit mode and through said received signal transmission path when in receive mode; and (d) a cancellation device, said cancellation device being electrically coupled to each of said transmitted signal transmission lines of said plurality of transmission path pairs for receipt of a transmitted signal sample from each of said plurality of transceivers that is operating in said transmit mode, said cancellation device being electrically coupled to said received signal transmission paths of said plurality of transmission path pairs for both receipt of a received signal sample and injection of an interference cancellation signal, said received signal sample having an interference portion and a non-interference portion, said cancellation device being responsive to said transmitted signal samples and said received signal sample and generating in response thereto said interference cancellation signal, said interference cancellation signal having substantially the same frequency and amplitude as said interference portion of said received signal sample, said interference cancellation signal being substantially 180° out-of-phase with said interference portion of said received signal sample.

2. Apparatus as defined in claim 1, wherein:

said plurality of collocated radio transceivers includes N of said transceivers, said plurality of second ports of said switch matrix includes N of said ports, and said plurality of transmission path pairs includes N of said transmission path pairs, N being an integer greater than 1;

said plurality of filters includes M of said filters, said plurality of desired operating frequency bands includes M of said bands, and said plurality of first ports of said switch matrix includes M of said ports, M being an integer greater than 1;

each of said N transceivers has both a transmit mode and a receive mode;

any given one of said N second ports of said switch matrix may be selectively interconnected with said common antenna through any given one of said M filters of said filter bank; and each of said N transmission path pairs includes both a transmitted signal transmission line and a received signal transmission path.

3. Apparatus as defined in claim 2, wherein each of said received signal transmission paths of said N transmission path pairs includes first and second transmission line segments having first and second ends, said first ends of said first segments being selectively electrically interconnected with said N second ports of said switch matrix, said second ends of said second segments being selectively electrically interconnected with said transceivers, and further comprising:

a main power combiner having N input ports and an output port, said input ports of said main power combiner being selectively electrically interconnected with said second ends of said first segments for combination of received signals carried in said received signal transmission paths into a combined signal, said received signals having passed through those of said M filters corresponding to those of said M desired operating frequency bands in which those of said N transceivers that are operating in said receive mode are operating;

an error correction transmission line from which said cancellation device receives said received signal sample and into which said cancellation device injects said interference cancellation signal, said error correction transmission line having a first end electrically interconnected with said output port of said main power combiner and also having a second end; and a main power splitter having an input port electrically interconnected to said second end of said error correction transmission line and also having N output ports, said N output ports being selectively electrically interconnected with said first ends of said second segments;

whereby said received signal transmission paths extend through said first transmission line segments, said main power combiner, said error correction transmission line, said main power splitter, and said second transmission line segments, for said combination of said received signals, for sampling and interference cancellation of said combined signal, and for splitting and distributing of said combined signal to each of said N transceivers that is operating in said receive mode.

4. Apparatus as defined in claim 3, wherein said received signal sample is received from said error correction transmission line by said cancellation device after said cancellation device has injected said interference cancellation signal into said error correction transmission line, thereby providing adaptive interference cancellation.

5. Apparatus as defined in claim 4, further comprising a low noise amplifier electrically connected between said second end of said error correction transmission line and said input port of said main power splitter to amplify said combined signal to make up for at least a portion of losses between said common antenna and said main power splitter.

6. Apparatus as defined in claim 5, wherein said cancellation device includes:

N cancellation loops corresponding to each of said transmitted signal transmission lines of said N transmission path pairs, each of said loops having a transmitted signal sample input port electrically interconnected to said corresponding one of said transmitted signal transmission lines of said N transmission path pairs, a received signal sample input port, and an interference cancellation signal output port;

an error sampling power splitter having an input port and N output ports electrically interconnected to one each of said received signal sample input ports of said N cancellation loops;

an error coupler connected between said input port of said error sampling power splitter and said error correction transmission line for tapping said received signal sample;

an interference cancellation signal power combiner having N input ports and an output port, said N input ports of said interference cancellation signal power combiner being electrically interconnected with one each of said interference cancellation signal output ports of said N cancellation loops to produce a combined interference cancellation signal; and a summing coupler connected between said output port of said interference cancellation signal power combiner and said error correction transmission line for injecting said combined interference cancellation signal.

7. Apparatus as defined in claim 6, wherein each of said N cancellation loops includes:

a phase detector having first and second input ports and I and Q output ports, said first input port of said phase detector being electrically interconnected with said transmitted signal sample input port for input of said transmitted signal sample, said second input port of said phase detector being electrically interconnected with a corresponding one of said N output ports of said error sampling power splitter, said phase detector comparing said transmitted signal sample and said received signal sample, said phase detector detecting in-phase components of said transmitted signal sample and said received signal sample and supplying to said I and Q output ports respectively I and Q components of said in-phase components;

I and Q loop amplifiers each having input and output ports, said input ports of said I and Q loop amplifiers being electrically interconnected respectively with said I and Q output ports of said phase detector, said I and Q loop amplifiers amplifying respectively said I and Q components of said in-phase components from said phase detector;

a vector modulator having a first input port, an I input port, a Q input port, and an output port, said first input port of said vector modulator being electrically interconnected with said transmitted signal sample input port for input of said transmitted signal sample, said I and Q input ports being electrically interconnected with said output ports of said I and Q loop amplifiers respectively, said output port of said vector modulator being electrically interconnected with a corresponding one of said N input ports of said interference cancellation signal power combiner, said vector modulator shifting said phase of said interference cancellation signal to be substantially 180° out-of-phase with said interference portion of said received signal sample.

8. Apparatus as defined in claim 2, wherein said M filters of said filter bank are electrically connected in a stacked arrangement between said common antenna and said M first ports of said switch matrix.

9. Apparatus as defined in claim 2, wherein:

said M filters of said filter bank are sub-divided into odd and even filter banks;

said M operating frequency bands and filters are numbered consecutively from 1 to M;

said odd filter bank contains those of said M filters that are odd-numbered; and said even numbered bank contains those of said M filters that are even-numbered;

further comprising a circulator, said circulator having an input port and first and second output ports, said input port of said circulator being electrically interconnected to said common antenna, said first output port of said circulator being electrically interconnected with a first one of said odd and even filter banks, said second output port of said circulator being electrically connected to a second one of said odd and even filter banks, whereby received signals input from said common antenna matching the frequency bands in said first one of said odd and even filter banks are transmitted thereby and received signals not matching the frequency bands in said first one of said odd and even filter banks are reflected and routed to said second output port for transmission through said filters of said second of said odd and even filter banks.

10. Apparatus as defined in claim 2, wherein:

said M filters of said filter bank are sub-divided into odd and even filter banks;

said M operating frequency bands and filters are numbered consecutively from 1 to M;

said odd filter bank contains those of said M filters that are odd-numbered; and said even numbered bank contains those of said M filters that are even-numbered;

further comprising a filter bank power splitter, said filter bank power splitter having an input port and first and second output ports, said input port of said filter bank power splitter being electrically interconnected to said common antenna, said first output port of said filter bank power splitter being electrically interconnected to a first one of said odd and even filter banks, said second output port of said filter bank power splitter being electrically interconnected to a second one of said odd and even filter banks, whereby received signals input from said common antenna are routed to those of said filters having matching frequency bands with reflection of non-matching signals.

11. Apparatus for mitigating interference between N collocated radio transceivers operating through a common antenna, each of said transceivers having a transmit mode and a receive mode, said apparatus comprising:

(a) a filter bank having a group of N tunable bandpass filters, each of said filters corresponding to one of said N transceivers, each of said filters being tuned to a desired operating frequency of its corresponding transceiver, each of said filters having a first port electrically coupled to said common antenna and having a second port;

(b) a group of N transmission path pairs for selective electrical interconnection of said N transceivers and said second ports of said corresponding filters, each of said N transmission path pairs including a transmitted signal transmission line and a received signal transmission path, each of said transceivers being connected to the second port of its corresponding bandpass filter through said transmitted signal transmission line when in said transmit mode and through said received signal transmission path when in said receive mode; and (c) a cancellation device, said cancellation device being electrically coupled to each of said transmitted signal transmission lines of said N transmission path pairs for receipt of a transmitted signal sample from each of said N transceivers that is operating in said transmit mode, said cancellation device being electrically coupled to said received signal transmission paths of said N transmission path pairs for both receipt of a received signal sample and injection of an interference cancellation signal, said received signal sample having an interference portion and a non-interference portion, said cancellation device being electrically configured to compare said transmitted signal samples with said received signal sample to produce said interference cancellation signal, said interference cancellation signal having substantially the same frequency and amplitude as said interference portion of said received signal sample, said interference cancellation signal being substantially 180° out-of-phase with said interference portion of said received signal sample.

12. A method for mitigating interference between N collocated radio transceivers operating through a common antenna, each of said transceivers having a transmit mode and a receive mode and having an associated frequency band, said method comprising the steps of:

(a) sampling a main output signal of each of those said N transceivers operating in transmit mode to provide sampled output signals;

(b) filtering each of said main output signals through a filter corresponding to the associated frequency band of the transceiver producing each one of said main output signals to substantially prevent subsequent transmission of out-of-band interference, said filtering step being performed after said sampling step (a);

(c) transmitting said main output signals through said common antenna after said step of filtering said main output signals;

(d) filtering a main received signal through a filter bank having a filter set to receive in each of said associated frequency bands of those of said N transceivers operating in receive mode, said main received signal having an interference portion and a non-interference portion, the number of those of said N transceivers operating in receive mode being designated as X, said filtering of said main received signal filtering out substantially all out-of-band interference from said main received signal;

(e) sampling said main received signal to provide a sampled received signal;

(f) comparing said sampled output signals and said sampled received signal in a cancellation device and generating an error correction signal which is substantially identical to but is 180° out of phase with said interference portion of said main received signal;

(g) combining said main received signal and said error correction signal to produce an error-corrected received signal that is substantially free of interference; and (h) dividing said received signal X ways for distribution to said X transceivers operating in receive mode.

\* \* \* \* \*